Patented Oct. 12, 1926.

1,602,826

UNITED STATES PATENT OFFICE.

DAVID FREDERICK KUHN, OF PHILADELPHIA, PENNSYLVANIA.

ART OF SALTING NUTS.

No Drawing.  Application filed April 20, 1925. Serial No. 24,680.

My improvement relates to improved processes of salting nuts and to a particular form of salted nut. This process preserves the freshness of the nuts, gives them a glaze and distributes the salt over them in a granular condition. The nuts retain their natural color, and few, even of the most fragile kinds, are broken in the process and these few are easily picked out and removed. Their appearance when prepared according to my improved process is very attractive. They hold their flavor, and they are prevented from becoming rancid.

The nuts can be blanched in any of the usual ways. However, preferably I blanch them as follows:—I place them for about five minutes in scalding water, which generally is long enough to permit the skins to be removed. They are then drawn from the hot water, and placed in cold water, and allowed to cool. They are then drawn from the cold water and the skins removed either by hand or machine.

The nuts are then placed in pans, lined with manilla paper or some similar material, and roasted in an oven. This should be done immediately after blanching them, and this roasting should be carried on with such care as will produce an evenly roasted nut. This roasting I do in a closed oven, having perfectly air-tight compartments so that the nuts, while being roasted, are not exposed to any deleterious gases, which, especially coal gas I exclude carefully from contact with them.

When the nuts have been roasted, I remove them from the oven, and place them in thin layers in cooling trays, at which time also I can remove any imperfect nuts.

While they are still warm, I pour over them a solution of gelatine (preferably about 1 oz. gelatine to one gill of water), one gill of this solution being used with each 15 lbs. of nuts. The nuts are stirred to make the coating as even as possible, and to make sure the entire surface of the nut is covered by it. This coating dries in about two minutes sufficiently to allow the salting. Just before the nuts coated with gelatine are quite dry, they are sprinkled with salt and stirred. The salt will be distributed evenly over the nuts but will not melt or run.

They are then placed in trays lined with manilla paper or similar material, and dried in a warm (not hot) air-tight drying room for about one hour. They are then ready for sale.

The nuts when so treated retain their native color; the salt is evenly distributed both as respects thickness of and regularity of coating. The evaporation of the moisture contained in the nut is greatly retarded and as the nut is protected from contact with the air it does not become rancid. As the use of fats or oils is unnecessary in my process, rancidness from them is also avoided. Burning of the nuts, and baking them hard in spots is also avoided because by my process great heat is not required at any stage. The proper flavor is obtained more certainly and readily through the above described method of roasting them.

I claim:—

1. The process of coating nuts with salt which comprises roasting them in an oven closed to the air until the desired flavor is attained, then removing them from the oven, and treating them, while still warm but not while being heated, with a solution of gelatine in water, and agitating them, and then after an interval, when the nuts are still warm and when the gelatine solution has nearly but not completely hardened, sprinkling them with salt and agitating them again, and then drying them at a moderate heat in an air tight receptacle.

2. The process as defined in claim 1, with this additional step, the nuts having been blanched previously to roasting them by placing them in hot water, drawing them from the hot water and placing them in cold water and allowing them to cool, and then drawing them from the cold water and removing the skins.

3. The process as defined in claim 1 with this additional element:—the gelatine solution being approximately one ounce of gelatine to one gill of water.

DAVID FREDERICK KUHN.